United States Patent [19]

Neil

[11] Patent Number: 4,469,396
[45] Date of Patent: Sep. 4, 1984

[54] AFOCAL DUAL MAGNIFICATION REFRACTOR TELESCOPES

[75] Inventor: Iain A. Neil, Glasgow, Scotland

[73] Assignee: Barr & Stroud Limited, Glasgow, Scotland

[21] Appl. No.: 299,198

[22] Filed: Sep. 3, 1981

[30] Foreign Application Priority Data

Oct. 8, 1980 [GB] United Kingdom ............... 8032396

[51] Int. Cl.³ ............................................. G02B 15/10
[52] U.S. Cl. ................................... 350/1.3; 350/422; 350/432; 350/437; 350/453
[58] Field of Search ............... 350/432, 437, 453, 1.1, 350/1.2, 1.3, 422

[56] References Cited

U.S. PATENT DOCUMENTS

| | | | |
|---|---|---|---|
| 3,947,084 | 3/1976 | Noyes | 350/1.3 |
| 4,397,520 | 8/1983 | Neil | 350/1.2 |
| 4,398,786 | 8/1983 | Neil | 350/1.2 |

*Primary Examiner*—Bruce Y. Arnold
*Attorney, Agent, or Firm*—Mason, Fenwick & Lawrence

[57] ABSTRACT

An afocal dual magnification refractor telescope is formed by a fixed focus achromatic telephoto objective system (21) formed by a primary objective lens element (H) and a secondary objective lens element (G) aligned on a common optical axis (19) with a fixed focus collimation system (22) and interchangeable high and low magnification lens systems (23,24) each of which is arranged to provide an internal real image (25,26). The high magnification lens system (23) is formed by two lens elements (B,C) and the low magnification lens system (24) is formed by three lens elements (D,E,F). The eight lens elements (A,B,C,D,E,F,G and H) are made of materials which have a useful spectral bandpass in the infrared wavelength region and the refractive surfaces of these lens elements which intercept the optical axis (19) are substantially except for one or both refractive surfaces (15,16) of the primary objective lens element (H). Each aspheric surface (15,16) possesses only a small degree of asphericity, lens element (H) is positively powered and secondary objective lens element (G) is negatively powered with a refractive index equal to or lower than that of the primary lens element (H) and the arrangement is such that for the high magnification mode the telescope has an internal f-number in the airspace between the primary and secondary objective lens elements (H,G) of less than 1.5.

5 Claims, 3 Drawing Figures

AFOCAL DUAL MAGNIFICATION REFRACTOR TELESCOPES

This invention relates to afocal dual magnification refractor telescopes.

The arrival of high performance forward looking infrared systems (commonly known by the acronym FLIR) has led to a demand for high performance afocal telescopes suitable for use with the FLIR system. For many FLIR system applications there is a requirement for two fields of view in object space (i.e. a dual magnification telescope). Various forms of such telescopes have been previously proposed but the practical requirement for compactness (i.e. short overall length) has imposed a requirement for low pupil aberrations. This has proved difficult to achieve without considerable optical and mechanical complexity in a refractor system. Catadioptric telescope systems with the required degree of compactness have been designed but these tend to be complex and additionally suffer from a central obscuration which is disadvantageous.

According to the present invention there is provided an afocal dual magnification refractor telescope formed by a fixed focus achromatic telephoto objective system composed of a primary objective lens element and a secondary objective lens element and a fixed focus collimation system composed of a single lens element aligned on a common optical axis and two different fixed focus, high and low, magnification lens systems which are alternatively alignable on said optical axis between said secondary objective lens element and said collimation system and respectively arranged to provide an internal real image, said high magnification lens system being formed by two lens elements and said low magnification lens system being formed by three lens elements, each of the eight lens elements of the telescope being made of a material which has a useful spectral bandpass in the infrared wavelength region and having refractive surfaces intercepting said optical axis with at least one refractive surface of the primary objective lens being aspheric and each of the refractive surfaces of the other lens elements of the telescope being substantially spherical, the aspheric surface or surfaces possessing only a small degree of asphericity, the secondary objective lens element being negatively powered and having a refractive index equal to or lower than the primary objective lens element which is positively powered, and for the high magnification mode the telescope has an internal f-number in the airspace between the primary and secondary objective lens elements of less than 1.5.

Because the telescope of the present invention is of the refractor type there is no obscuration in each of the two fields of view; with only eight lens elements of which five lens elements are used in the high magnification mode and six lens elements are used in the low magnification mode and with the high and low magnification lens systems readily coupled and made interchangeable by utilising a single rotary mechanism, the system is optically and mechanically simple; with all but one of the lens elements having substantially spherical refractive surfaces, the non-spherical surface or surfaces possessing an aspheric profile which exhibits only a small departure from a spherical profile, the lens elements are easy to manufacture.

The objective system may be colour corrected by making the dispersive V-value of the secondary objective lens element less than that of the primary objective lens element and the telescope can be made extremely compact with a performance near the diffraction limit over a wide range of dual magnifications by making the refractive index of the secondary objective lens element less than that of the primary objective lens element.

The colour correcting lens element of the objective system may be a chalcogenide glass such as that sold by Barr and Stroud Limited under their designation 'Type 1 Chalcogenide Glass', whereas each of the other seven lens elements may be made of germanium, all of which materials have a useful spectralbandpass in the 3-13 micron infrared wavelength region. Alternatively, the colour correcting lens element may be made from any other optical material which exhibits suitable physical characteristics. Table VI recites some of the most suitable optical materials.

The colour correcting lens element may be fixedly mounted with respect to the other lens elements but conveniently it is movable along the optical axis as a result of which the telescope can be compensated for changes in ambient temperature which produce shifts in position of the two real images alternatively formed within the telescope. Also, such movement of the colour correcting lens element can be utilised to vary the two foci of the telescope (without departing from its so called 'afocal' nature) provided that the two real images formed within the telescope are not of high quality. This is conveniently achieved when the colour correcting lens element is of low optical power since minimal magnification changes are produced when this element is moved.

Alternatively, or additionally, the telescope can be compensated for changes in ambient temperature by constructing the framework for the lens systems using materials of which at least two materials have different thermal expansion coefficients (i.e. passive mechanical athermalisation). The colour correcting lens element may be movable along the optical axis or it can be fixedly mounted with respect to the other lens elements at a position which provides the telescope with two fixed focii, typically the hyperfocal focii.

Because the high magnification lens system and low magnification lens system cannot simultaneously be aligned on the optical axis it is required that they be alternately aligned on the optical axis. Although several methods may each accomplish this operation perhaps the most simple method employs a carousel-type mechanism wherein the high and low magnification lens systems are aligned at ninety degrees to one another on a single carriage which can be rotated about a fixed point by ninety degrees in a manner whereby either the high magnification lens system is aligned with the common optical axis while the low magnification lens system is in a parked position hence providing the telescope with the high magnification mode or vice versa.

An embodiment of the present invention will now be described by way of example with reference to the accompanying schematic drawings and tables.

Figure 1:
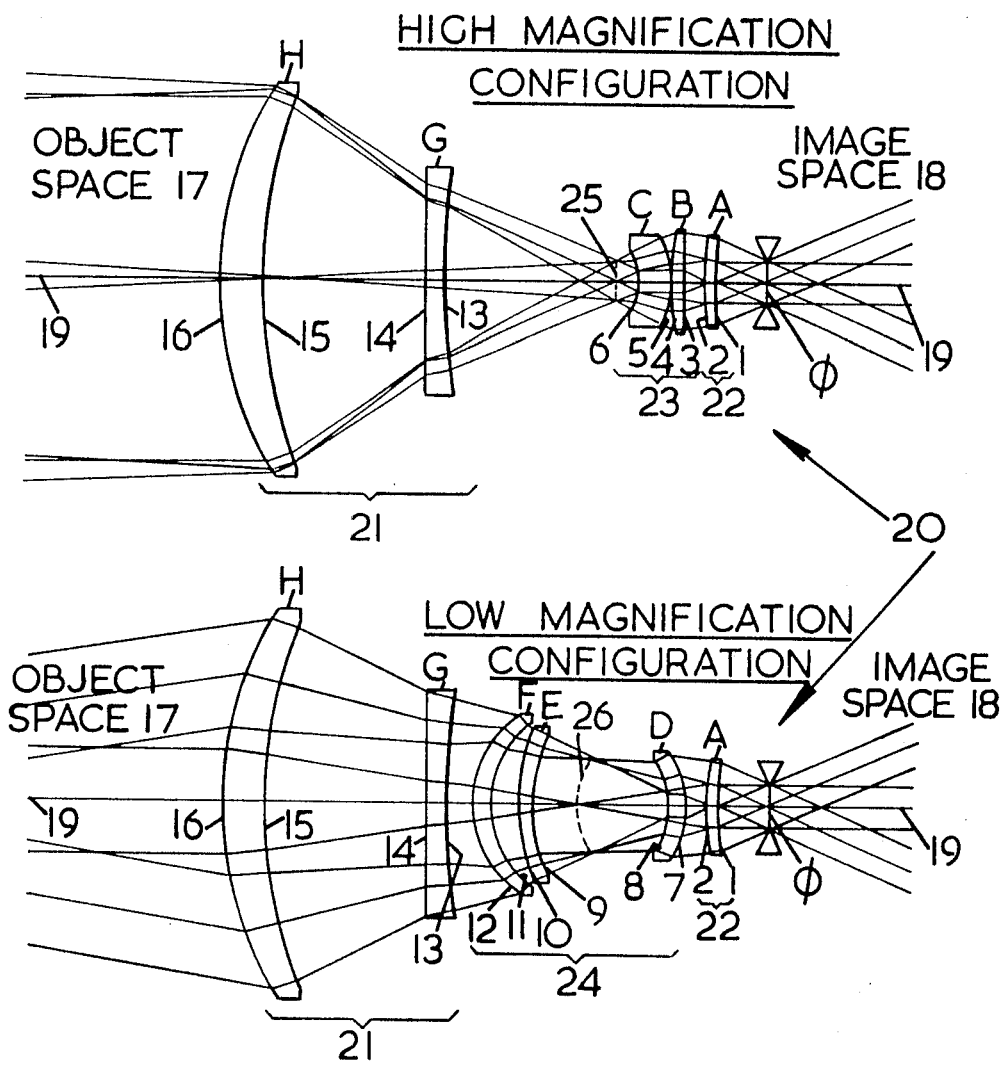
FIG. 1 illustrates a telescope incorporating a first arrangement of high and low magnification lens groups.

As is shown in FIG. 1 a telescope 20 is formed by an objective system 21, a collimation system 22, a high magnification system 23 and a low magnification system 24 aligned on a common optical axis 19, the high and low magnification systems 23 and 24 being arranged in a manner whereby they are not simultaneously aligned on the common optical axis 19. The telescope 20 is of the afocal refractor type and when the high magnification system 23 is aligned on the common optical axis 19 the telescope internally forms a real image 25 and when the low magnification system 24 is aligned on the common optical axis 19 the telescope internally forms a real image 26, both images being formed from radiation entering the telescope from object space 17. The objective system 21 is telephoto and formed by a primary lens element H and a secondary lens element G, the latter being negatively powered (i.e. divergent) and colour corrective whereas the former is positively powered (i.e. convergent). Element G has refractive surfaces 13, 14 and element H has refractive surfaces 15, 16. The collimation system 22 is formed by a single positively powered lens element A with refractive surfaces 1, 2. The high magnification system 23 is formed by two positively powered lens elements B, C with respective refractive surfaces 3, 4 and 5, 6. The low magnification system 24 is formed by three lens elements D, E, F of which the elements D and F are positively powered with respective refractive surfaces 7, 8 and 11, 12 and the element E is negatively powered with refractive surfaces 9, 10. Element A forms a fixed focus system, elements B and C together form a fixed focus system, elements D, E and F together form a fixed focus system and elements G and H together form a fixed focus system so that the objective system 21 accepts bundles of rays from two different entrance pupils formed in the object space 17 then either the high magnification system 23 colleccts radiation from the inverted real image 25 and provides an output ray bundle to the collimation system 22 or the low magnification system 24 collects radiation from the objective system 21, internally forms an inverted real image 26 and provides an output ray bundle to the collimation system 22, the two output ray bundles are then collected by the collimation system 22 which provides two bundles of parallel rays which form an exit pupil $\phi$ in image space 18, the two bundles of parallel rays in image space 18 being identical excepting small differences of optical aberrations. The optical power of and the spacing between the various lens elements A, B, C, D, E, F, G, H, is arranged such that, in the high magnification mode, the image 25 lies between refractive surfaces 5 and 13 and in the low magnification mode the image 26 lies between refractive surfaces 8 and 9.

The refractive surfaces 1, 2, 3, 4, 5, 6, 7, 8, 9, 10, 11, 12, 13, 14, and 16 are each substantially spherical, i.e. if they are not truly spherical they are 'spherical' within the meaning of the art, whereas surface 15 in having an aspheric profile is non-spherical.

The telescope 20 is designed for use in the infrared wavelength region (i.e. 3–13 microns) and consequently the refractive indices of the lens elements are relatively large but in order to provide sufficiently high optical performance lens element G is colour corrective, negatively powered and has a lower refractive index than element H. This is achieved for the 8–13 micron range by making lens elements A, B, C, D, E, F and H of germanium, the refractive index of which is 4.00322, and lens element G of Barr & Stroud Type 1 chalcogenide glass, the refractive index of which is 2.49158, measured at a wavelength of 10 microns and at a temperature of 20° C. In this case element G has a dispersive capacity, or V-value, of 152, where the V-value is defined as the ratio of the refractive index at 10.0 microns minus 1 to the refractive index at 8.5 microns minus the refractive index at 11.5 microns. These materials are suited to being anti-reflection coated and when anti-reflection coated, provide a telescope with at least 65% transmission in both magnification modes of incident radiation in the 8.5 to 11.5 micron range.

The lens element G is preferably movable along the optical axis 19 whereas the other lens elements A,B,C,D,E,F and H are not and this permits compensation of the telescope against movements in the positions of the two images 25 and 26, induced by ambient temperature changes typically within the range −10° C. to +50° C. Furthermore, for fixed positions of the images 25 and 26 the telescope can be focussed on distant objects, typically within the ranges 50 meters to infinity for the high magnification mode and 10 meters to infinity for the low magnification mode.

Alternatively lens element G and the other lens elements A,B,C,D,E,F and H can be fixedly mounted. By suitably constructing the surrounding framework which supports lens elements E,F and H using a material or materials which afford high thermal expansion coefficients such as an ultra high molecular weight polyethylene (commonly known by the acronym 'UHMPE') and by constructing the remaining telescope framework using a material or materials which afford relatively low thermal expansion coefficients such as aluminum (thermal expansion coefficient of aluminium$\simeq 23 \times 10^{-6}$, UHMPE$\simeq 125$–$225 \times 10^{-6}$) it is possible to compensate the telescope for ambient temperatures over −40° C. to 70° C. maintaining constant focii and good optical performance. Although this only provides the telescope with two fixed focii it eliminates the need for any movement of lens element G and hence the active mechanics which move lens element G.

Figure 2:
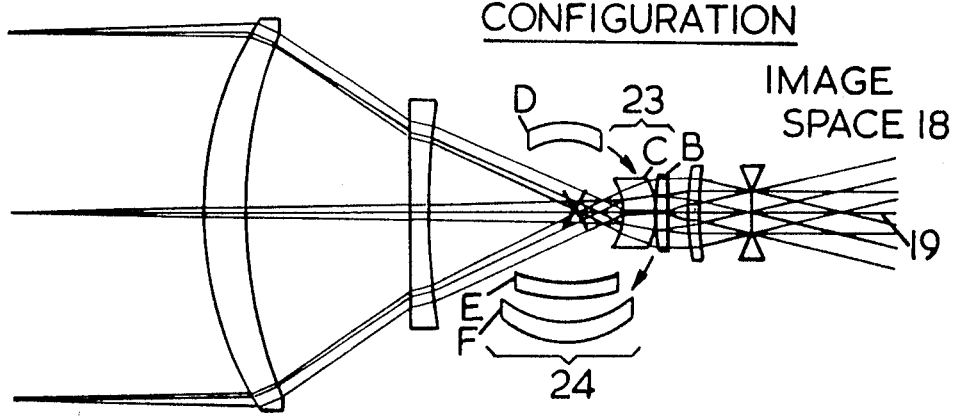
FIG. 2 illustrates a second, carousel-type, arrangement for the two lens groups.
Figure 2:
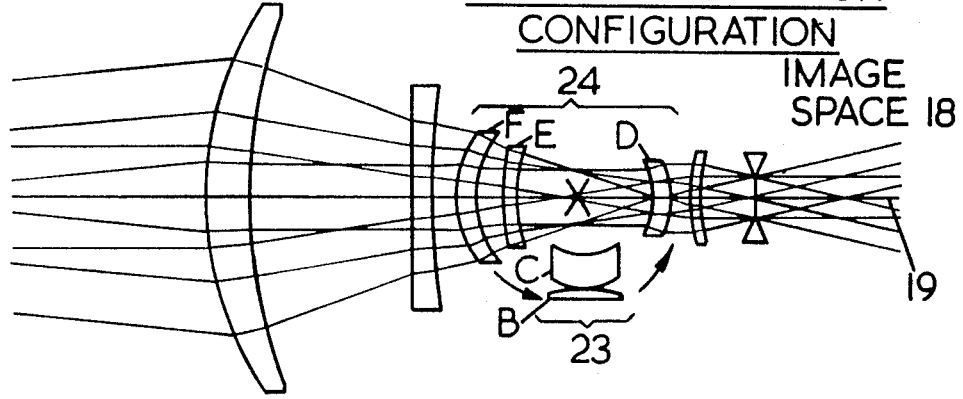

As is shown in FIG. 2 the high magnification lens system 23 and the low magnification lens system 24 can be alternately aligned on the common optical axis 19 using a carousel type mechanism which rotates the lens systems 23 and 24 about the point X. Because the telescope of the present invention is extremely compact with an internal f-number for the high magnification mode of less than 1.5 in the airspace between lens elements G and H and because the field of view in image space 18 is 38.1° (horizontal)×26.5° (vertical) and 46.4° (diagonal), the high and low magnification systems 23 and 24 are most easily rotated in the vertical plane. This has the advantage of reducing the maximum field angle of the ray bundles and the clear apertures of the lens elements B, C, D, E and F which together ease the space constraints. FIG. 1 shows the 46.4° field of view whereas FIG. 2 shows the 26.5° field of view arrangement in image space.

One example of the telescope 20 is detailed in Tables I and II wherein the radius of curvature of each refractive surface is given together with the aperture diameter of each surface and of the pupil $\phi$, the position of which is used as a datum from which the separation of successive refractive surfaces is defined, together with the nature of the material relevant to such separation interval. Thus, for example, surface 11 has a radius of curvature of −38.10 millimeters, the minus sign indicating that the centre of curvature is to the right hand side of surface 11; it is separated by an air space of 10.32 millimeters from the preceding surface, No. 10, in the direction of the pupil $\phi$; it has an aperture diameter of 59.36 millimeters; and is separated from the succeeding surface, No. 12, by a distance 6.87 millimeters in germanium. Table I details the telescope 20 when it is in the high magnification mode and Table II details the telescope 20 when it is in the low magnification mode. It will be seen that the sum of all the separations in Table I equals the sum of all the separations in Table II. The co-ordinates of the rotation point X are 67.7 millimeters from the entrance pupil $\phi$ along the optical axis 19 (to the left) and 3.6 millimeters perpendicular to the optical axis (downwards).

Figure 3:
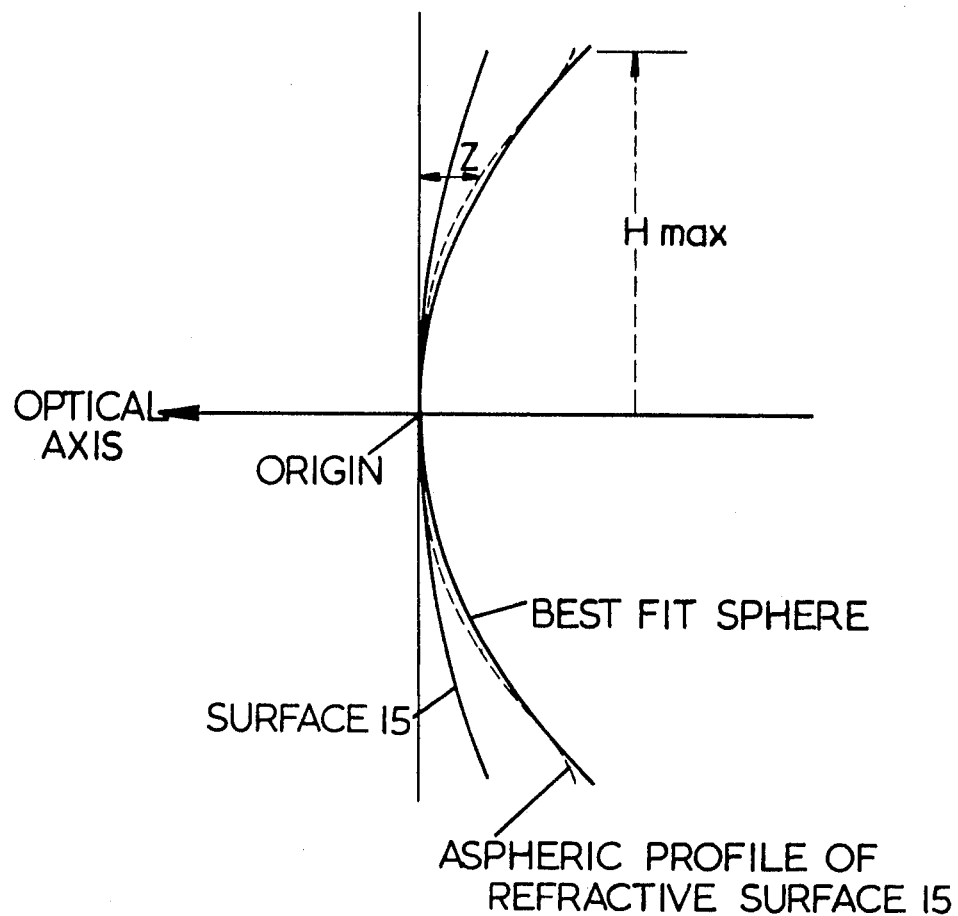
FIG. 3 illustrates the aspheric profile of a surface of the primary objective lens.

The aspheric profile of refractive surface 15 is shown in FIG. 3, where separations parallel to the optical axis between both the aspheric profile and the best fit sphere, and the datum spherical surface 15' are scaled by a factor of 2000; the aspheric profile is governed by the following equation:

$$Z \cdot C = 1 - \sqrt{1 - C(C \cdot H^2 + B \cdot H^4 + G \cdot H^6 + \ldots)} \quad (1)$$

where,

Z = distance along optical axis.
C = 1/R; R = radius of curvature of surface 15'
($= -193.98$ mm)
H = radius distance perpendicular to optical axis
(maximum value = 68.954 mm)
B = first order aspheric coefficient ($= -2.07 \times 10^{-9}$)
G = second order aspheric coefficient
($= +2.93 \times 10^{-13}$)
... = higher order terms ($=0.0$).

and the best fit sphere is the spherical surface from which the aspheric profile makes only a small departure. Table V contains calculated values of separation between the aspheric profile and the best fit sphere for different aperture heights, and the radius of curvature of the best fit sphere. It will be noted that the degree of asphericity is small.

This telescope produces a high magnification of $\times 9.0$ and a low magnification of $\times 2.5$, and when in the high magnification mode has an internal f-number of 0.89 in the airspace between the lens elements G and H. Colour correction is maintained over the 8.5 to 11.5 micron range and with element G movable focussing is available in the high magnification mode over the range 50 meters to infinity and in the low magnification mode over the range 10 meters to infinity and thermal compensation is available in both modes of magnification over the range $-10°$ C.-$+50°$ C. with minimal degradation in overall performance. For practical purposes, if the performance degradation is acceptable, the range for focus in the high and low modes of magnification can be increased to 10 meters to infinity and 5 meters to infinity respectively and in both modes of magnification the range for thermal compensation can be increased to $-40°$ C.-$+70°$ C. Alternatively element G and all the other lens elements can be fixedly mounted, thus providing two fixed focii and thermal compensation achieved by passive means. Such thermal compensation is available over the range $-40°$ C. - $+70°$ C. with minimal degradation in overall performance. Specific values of image quality for this telescope are given in Tables III and IV, the former providing data relevant to the high magnification mode when focussed at a distance of approximately 650 meters and the latter providing data relevant to the low magnification mode when focussed at a distance of approximately 55 meters.

The telescope which has been described when in the high magnification mode provides high performance over at least two-thirds of the full field with a primary objective aperture diameter enlarged by only 5.4% to accommodate pupil aberrations and, when in the low magnification mode, provides high performance over at least two-thirds of the full field. For the high and low magnification modes the telescope produces angular distortion at the maximum field angle of only about $+1.5\%$ and $-1.0\%$ respectively, the $+$ve sign indicating increasing magnification with increasing field angle and the $+$ve sign indicating decreasing magnification with increasing field angle. Because some FLIR system applications demand that the telescope ray bundles in close object space (i.e. at distances up to or exceeding about 500 mm in front of the primary objective lens element) are confined to a predetermined cross sectional area it is necessary that the telescope in the low magnification mode has ray bundles which in object space converge. It can be seen that the telescope which has been described meets this requirement and achieves the previous performance specification without vignetting at any of the refractive surfaces of the lens elements and without introducing any noticeable narcissus effect. Also, this is achieved for a telescope which is of short overall length and has a compact dual magnification lens system.

The telescope detailed in Tables I-V inclusive can be scaled and optimised to provide a wide range of high and low magnifications, the ratio between the high and low magnifications being typically within the ranges 6:1 and 2:1, with the general lens configuration remaining constant. If the high magnification mode is of a sufficiently low magnification such that colour correction is not required it is then possible to make the colour correcting lens element from germanium. Although only two aspheric coefficients have been used in the equation to provide the lens solution given in the aforedescribed telescope more (i.e. higher order) aspheric coefficients can be used if so wished. It is also possible to optimise this telescope in such a way that it can provide a different field of view and pupil diameter in image space thus making the telescope suitable for attachment to different detector systems which may or may not use scanning mechanisms. It is to be noted that all details given in Tables I to VI inclusive are for 20° C. and the f-number specified herein is derived from the formula $(2.\sin\theta)^{-1}$ where $\theta$ is the half angle of the cone formed by the axial field pencil after refraction from the lens element on which the pencil is incident.

Although the embodiment describes only refractive surface 15 being aspheric it will be appreciated that the same performance could be achieved by making only surface 16 aspheric or by making both surfaces 15, 16 aspheric, this latter arrangement having the advantage that the total degree of asphericity will be apportioned between the two surfaces so that each will then have a much reduced degree of asphericity in comparison with that of surface 15 as detailed in Table V.

TABLE I

| Lens | Surface | Separation | Radius of Curvature | Material | Aperture** Diameter |
|---|---|---|---|---|---|
| Entrance Pupil* | 0 | 0 | Flat | Air | 15.30 |
| A | 1 | 19.52 | −199.20 | Air | 32.80 |
|   | 2 | 4.18 | −100.08 | Ge | 33.92 |
| B | 3 | 8.50 | −476.45 | Air | 36.54 |
|   | 4 | 3.75 | −110.89 | Ge | 36.87 |
| C | 5 | 0.50 | 30.79 | Air | 33.16 |
|   | 6 | 12.77 | 23.01 | Ge | 21.71 |
| G | 13 | 74.06 | −286.13 | Air | 66.69 |
|   | 14 | 7.50 | −7621.95 | As/Se/Ge(BS1) | 70.97 |
| H | 15' # | 61.95 | −193.98 | Air | 137.91 |
|   | 16 | 15.71 | −135.64 | Ge | 144.82 |

*Maximum field angle at entrance pupil = 46.4°.
**As required by this magnification mode.
Surface 15 has an aspheric profile.

TABLE II

| Lens | Surface | Separation | Radius of Curvature | Material | Aperture** Diameter |
|---|---|---|---|---|---|
| Entrance Pupil* | 0 | 0 | Flat | Air | 15.30 |
| A | 1 | 19.52 | −199.20 | Air | 32.80 |
|   | 2 | 4.18 | −100.08 | Ge | 33.92 |
| D | 7 | 8.26 | 33.02 | Air | 38.25 |
|   | 8 | 6.61 | 29.46 | Ge | 32.94 |
| E | 9 | 51.99 | −60.96 | Air | 51.83 |
|   | 10 | 5.34 | −74.93 | Ge | 57.00 |
| F | 11 | 10.32 | −38.10 | Air | 59.36 |
|   | 12 | 6.87 | −39.70 | Ge | 66.28 |
| G | 13 | 10.19 | −286.13 | Air | 79.29 |
|   | 14 | 7.50 | −7621.95 | As/Se/Ge(BS1) | 83.08 |
| H | 15' # | 61.95 | −193.98 | Air | 133.43 |
|   | 16 | 15.71 | −135.64 | Ge | 139.91 |

*Maximum field angle at entrance pupil = 46.4°.
**As required by this magnification mode.
Surface 15 has an aspheric profile.

TABLE III

Approximate R.M.S. Spot Sizes in Object Space (in milliradians).

| Field | Monochromatic at 10.0 microns | *Chromatic over 8.5–11.5 microns |
|---|---|---|
| Axial | 0.040 | 0.075 |
| ⅓ | 0.044 | 0.093 |
| ⅔ | 0.052 | 0.108 |
| Full | 0.089 | 0.140 |

*Given as an equally weighted three wavelength accumulated measurement, the wavelengths being 8.5, 10.0 and 11.5 microns.

TABLE IV

Approximate R.M.S. Spot Sizes in Object Space (in milliradians)

| Field | Monochromatic at 10.0 microns | *Chromatic over 8.5–11.5 microns |
|---|---|---|
| Axial | 0.311 | 0.312 |
| ⅓ | 0.318 | 0.340 |
| ⅔ | 0.365 | 0.378 |
| Full | 0.347 | 0.381 |

*Given as an equally weighted three wavelength accumulated measurement, the wavelengths being 8.5, 10.0 and 11.5 microns.

TABLE V

| Radial Distance Perpendicular to Optical Axis (mm) | Depth# of Aspheric Profile (microns) |
|---|---|
| 0.00 | 0.00 |
| 2.76 | −0.01 |
| 5.52 | −0.05 |
| 8.27 | −0.12 |
| 11.03 | −0.20 |
| 13.79 | −0.31 |
| 16.55 | −0.42 |
| 19.31 | −0.54 |
| 22.07 | −0.65 |
| 24.82 | −0.76 |
| 27.58 | −0.85 |
| 30.34 | −0.91 |
| 33.10 | −0.95 |
| 35.86 | −0.95 |
| 38.61 | −0.91 |
| 41.37 | −0.83 |
| 44.13 | −0.72 |
| 46.89 | −0.58 |
| 49.65 | −0.42 |
| 52.41 | −0.27 |
| 55.16 | −0.13 |
| 57.92 | −0.05 |
| 60.68 | −0.07 |
| 63.44 | −0.24 |
| 66.20 | −0.61 |
| 68.95 | −1.26 |

Radius of curvature of the best fit sphere = −193.84 mm

Depth of aspheric profile is defined as the separation distance between points, of equal radial distance perpendicular to the optical axis, on the aspheric profile and best fit sphere. The negative sign signifies the removal of lens element material from the best fit sphere to obtain the aspheric profile.

TABLE VI

| Material | Refractive index* | V-value# |
|---|---|---|
| BS2 | 2.85632 | 248 |
| BSA | 2.77917 | 209 |
| TI 1173 | 2.60010 | 142 |
| AMTIR | 2.49745 | 169 |
| BS1 | 2.49158 | 152 |

TABLE VI-continued

| Material | Refractive index* | V-value# |
|---|---|---|
| Tl 20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*The refractive index is for 10 microns.
Over the wavelength range 8.5–11.5 microns.

What is claimed is:

1. An afocal, dual magnification, refractor telescope formed by a fixed-focus, achromatic, objective lens system, a fixed-focus, collimation system, and two different fixed focus, high and low, magnification lens systems, said objective lens system being composed of a primary objective lens element and a secondary objective lens element, said collimation system being composed of a single lens element aligned on a common optical axis with said objective lens system, and said two magnification lens systems being alternatively alignable on said optical axis between said secondary objective lens element and said collimation system and respectively arranged to provide an internal real image, said high magnification lens system being formed by two lens elements and said low magnification lens system being formed by three lens elements, each of the eight lens elements of the telescope being made of a material which has a useful spectral bandpass in the infrared wavelength region and having refractive surfaces intercepting said optical axis, at least one refractive surface of the primary objective lens element being aspheric and each of the refractive surfaces of the other lens elements of the telescope being substantially spherical, the aspheric surface or surfaces possessing only a small degree of asphericity, the secondary objective lens element being negatively powered and having a refractive index equal to or lower than the primary objective lens element which is positively powered and wherein, for the high magnification mode, the telescope has an internal f-number in the airspace between the primary and secondary objective lens elements of less than 1.5.

2. A telescope as claimed in claim 1, wherein both refractive surfaces of the primary objective lens element have a small degree of asphericity.

3. A telescope as claimed in claim 1, wherein each aspheric surface conforms to the equation $$Z \cdot C = 1 - \sqrt{1 - C(C \cdot H^2 + B \cdot H^4 + G \cdot H^6)}$$

where
- $Z$ = the distance along the optical axis,
- $H$ = the radial distance perpendicular to the optical axis,
- $C$ = the inverse of the radius of curvature of a datum spherical surface,
- $B$ = the first order aspheric coefficient, and
- $G$ = the second order aspheric coefficient.

4. A telescope as claimed in claim 1, wherein said secondary objective lens element, at a temperature of 20° C. and at a wavelength of 10 microns, has a refractive index equal to or lower than that of each of the other lens elements.

5. A telescope as claimed in claim 1, wherein one or more of said refracting surfaces has an anti-reflection coating.

* * * * *